United States Patent Office 3,409,994
Patented Nov. 12, 1968

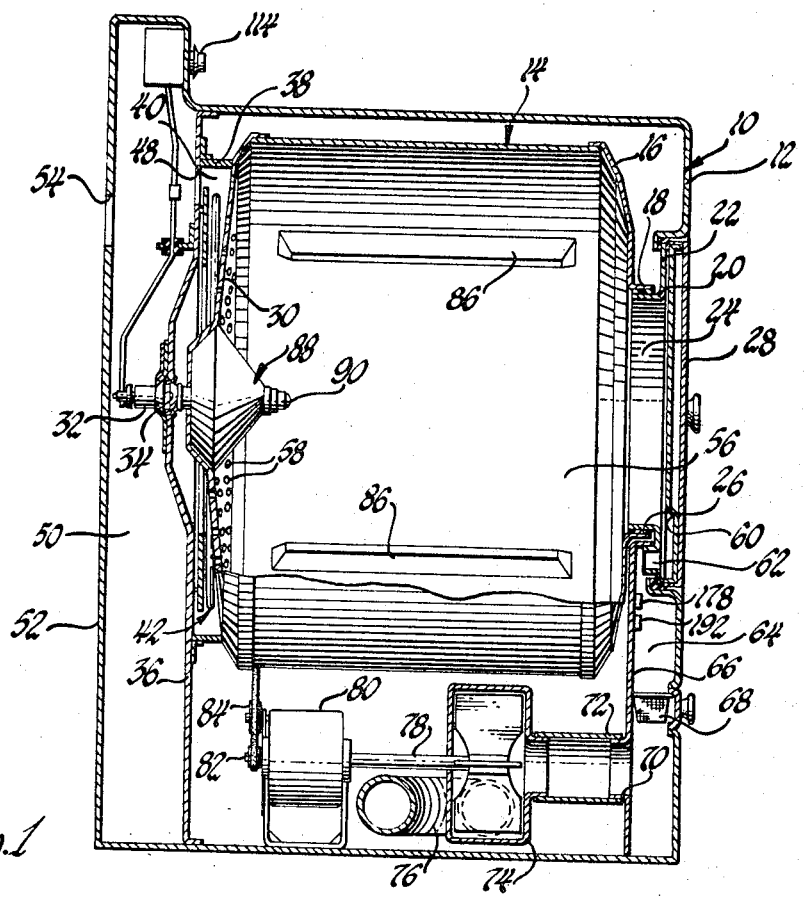

3,409,994
HEATING CONTROL SYSTEM FOR
CLOTHES DRYER
Melvin A. Menk, Englewood, Ohio, assignor to General
Motors Corporation, Detroit, Mich., a corporation of
Delaware
Filed Sept. 15, 1966, Ser. No. 579,630
16 Claims. (Cl. 34—33)

ABSTRACT OF THE DISCLOSURE

A control system for regulating the thermal input of a clothes dryer including first thermostatic energy control means responsive to a first predetermined exhaust temperature of the air stream to vary the thermal input from a high to a low level. A second thermostatic control means is electrically connected to the first control means during high level energization to terminate thermal input when a predetermined maximum temperature is sensed. This second thermostatic control means includes a biasing resistance heater energized only during the low level energization period to change the responsiveness of the second thermostatic control means to open the heater circuit at temperatures below the predetermined maximum temperature. A direct moisture sensor and solid-state module terminates the drying cycle.

---

This invention relates to drying apparatus and more particularly to an improved system for controlling heating means in drying apparatus to prevent undesirable temperature increases in articles being processed and a termination of heat input upon the occurrence of a predetermined moisture content in the articles being dried.

One problem in article drying apparatus is that of how to control the heating means therein so that the energy output therefrom can be most efficiently used to vaporize moisture that is present in the articles without overdrying the articles or causing an undesirable temperature increase in the articles during the drying operation.

In many dryer control systems in order to prevent undesirable drying temperature of certain delicate fabrics, manual selector means are used to condition control means for an energy source such as an electric or gas heater to limit the amount of energy output therefrom to prevent a heated air stream circulating through the clothes from exceeding a predetermined temperature at which the articles might be damaged. An example of a control system that includes such fabric selector heat limiting means is set forth in United States Patent No. 2,878,579 issued Mar. 24, 1959.

Other systems have been proposed to maintain a controlled energy output from the heater of dryer apparatus to prevent an undesirable temperature increase in the air stream in order to effectively economize on the energy being used during the drying cycle of operation. Such systems are automatically programmed to cut back the energy output from the heater of a dryer apparatus when a temperature increase in a heated air stream is sensed which reflects the fact that an undesirable part of the energy output of the heater of the apparatus is being used to raise the temperature of the air stream rather than to vaporize moisture in the clothes. In such systems the energy of the output of the heater means is varied by thermostatically controlled switch means that respond to the temperature of the air stream being circulated through the articles being treated. However, in such systems, typically once the exhaust air stream temperature attains a predetermined level, a timer motor controlled switch is operated to control energy input during final drying and also to terminate the operation of the dryer. An example of this type of system is set forth in United States Patent No. 2,851,789, issued Sept. 16, 1958.

Another type of control system for automatically establishing a drying cycle in a clothes drying apparatus is of the type wherein thermostatic means sense the temperature of a heated air stream in the drying apparatus and are responsive thereto so as to condition a plurality of heaters from a high energy output state to a low energy output state. In such arrangements, typically, one thermostat, after sensing a predetermined undesirable increase in the air stream temperature reflecting an uneconomical use of the energy input thereto, is operated in response to such a temperature increase to terminate the drying cycle of operation. An example of this type of system is set forth in United States Patent No. 3,203,679, issued Aug. 31, 1965.

While all of the above-described systems are suitable for their intended purpose, they all are characterized by a certain lack of flexibility in control. For example, in the case of dryer apparatus having fabric selectors for varying heat input, there is a need to preset the dryer control in accordance with the type of fabric being treated. Furthermore, in cases of dryer apparatus having a thermostatically controlled system which utilizes a timer motor to terminate the drying operation, depending upon the temperature characteristics of the controlling thermostats, the system may or may not be suitable for a wide range of fabrics and load sizes. Furthermore, the air stream temperature sensed by the thermostatic means in such controls is not always an accurate indicia of the actual moisture content in the articles being treated at the end of the drying operation. Also in systems of the type including a pure thermostatically controlled automatic system for varying the energy output of heating means so as to economize the use of energy in drying apparatus, there is a problem at times of terminating the drying operation either prematurely or only after articles have been overdried.

Accordingly, an object of the present invention is to provide an improved control system for automatically controlling the energy input to a dryer wherein the need for a fabric selector to reduce the energy output capabilities of a heater is eliminated.

Another object of the present invention is to improve domestic clothes dryers for processing a wide variety of fabric by the provision of improved control means for producing a sustained high-energy input during initial phases of a drying cycle of operation wherein the initial sustained high-energy output is terminated when the exhaust air stream in the dryer apparatus attains a predetermined maximum temperature and wherein the dryer is subsequently operated so that the heating means thereof has a reduced energy output which is maintained in a manner to prevent the temperature of the air stream through the dryer from increasing to the predetermined maximum terminating temperature whereby articles being processed are protected against overheating.

A further object of the present invention is to provide such a control system wherein an improved thermostatically operated control system is utilized to maintain heating means conditioned for a high-energy output during an initial phase of dryer operation and wherein energy level switching thermostatic means are present for sensing a predetermined temperature of a heated air stream through the drying apparatus for conditioning the heating means to a low-energy output and wherein circuit means are provided for so conditioning the heating means from a high to a low-energy state of operation which includes heater controlling thermostatic means operative during the low-energy phase of operation of the heating means to cycle the heating means on and off in response to air stream temperatures below the predetermined temperature at which the heating means is switched from its high-energy output to its low-energy output.

Yet another object of the present invention is to provide an improved thermostatically operated energy level controlling system of the type set forth above wherein the thermostatic means for controlling the low-energy phase of operation of the heating means is conditioned by means including the energy level switching thermostatic means for causing said low-energy level controlling thermostatic means to modulate the energization of the heating means during the low-phase energy output therefrom in accordance with the temperature of the heated air stream.

Still another object of the present invention is to improve drying apparatus of the type including a heated air stream for removing moisture from articles being processed by the provision of a dryer cycle of operation wherein the energy output of heating means in the dryer is maintained at high and low-energy phases of operation to prevent damaging articles being processed and wherein termination of the drying operation is produced by means directly contacting the articles and responsive to the moisture level therein to prevent overdrying the articles.

Still another object of the present invention is to improve a two-level energy input control system for drying apparatus having a heated air stream wherein the two-level energy input is established by the selective energization of various combinations of a plurality of heaters by the provision of an energization circuit for the plurality of heaters including a main control thermostat electrically connected in controlling relationship with a part of a plurality of heaters during all phases of dryer operation and wherein the system includes a low-energy input control thermostate responsive to a predetermined temperature in the air stream and operative to de-energize a part of the plurality of heaters upon the occurrence of the predetermined temperature in the air stream so as to reduce the energy output from the plurality of heaters and wherein biasing means are provided in circuit relationship with the low-energy input control thermostat and operative upon the switching of the plurality of heaters to a low-energy output to condition the primary control thermostat to cyclically control the energization of the heaters so as to maintain an air stream temperature reduced from the predetermined air stream temperature at which the energy output level of the plurality of heaters is reduced until a clothes load is substantially dry and whereby the primary control thermostat thereafter pulses at a rate varying in accordance with increasing air stream temperature to prevent excessive clothes load temperatures.

Still another object of the present invention is to improve automatic clothes drying system of the type having a heated fluid stream directed across wet articles for removing moisture therefrom by the provision of an improved control system including air stream temperature responsive thermostatic means for maintaining a high and low-energy output from heating means that raise the temperature of the air stream and where in the thermostatic means includes means for producing a sustained high energy output for a period of time and a cyclically controlled low-energy output for a second period of time and wherein the thermostatic control means are resettable upon the occurrence of a reduction in the temperature of the air stream below the cyclical control point during the second phase of operation to condition the heating means to a high-energy output in response to such a decrease in the air stream temperature; and to provide such a system wherein during such air stream responsive control of the energy output of the heating means of such dryer operation, primary dryer operation terminating means are included operative to terminate drying in direct response to the moisture content in articles being treated; and to provide such a system wherein the dryer terminating control means includes means for directly contacting the articles to detect the moisture content thereof so as to initiate the termination of the dryer operation when the contacted articles have a desired moisture content therein.

Further objects and advantages of the present invention will be apparent from the following description, reference being had to the accompanying drawings wherein a preferred embodiment of the present invention is clearly shown.

In the drawings:

FIGURE 1 is a vertical, sectional view of a domestic clothes dryer including the present invention; and FIGURE 2 is an electrical circuit diagram showing a control system embodying the concepts of the present invention.

Referring now to the drawing which shows one preferred embodiment of a system utilizing the concepts of the present invention, in FIGURE 1 a domestic clothes dryer 10 is illustrated having an outer casing 12 within which is located a rotatable tumbling drum 14 having a front cover 16 with an outwardly directed flange 18 thereon which is supported for rotation on a radially inwardly directed flange 20 of a front port plate 22 supported on the front wall of the outer casing of the housing 10 to define an access opening 24 therethrough. An annular seal 26 is located between flanges 18, 20 for preventing air flow therebetween. On the front wall of the outer casing of dryer 10 is located a closure element 28 that is mounted thereon so as to be movable into a position where the access opening 26 is blocked during dryer operation.

The tumbling drum 14 further includes a rear wall 30 to which is secured a rearwardly directed shaft 32 that is supported by bearing means 34 so as to be rotatably supported by a bulkhead 36 located interiorly of the outer casing of the dryer 10 and rearwardly thereof. On the bulkhead 36 is supported an annular seal 38 which is directed forwardly of the bulkhead 36 so as to slidably sealingly engage the outer periphery of the rear wall 30 of the drum throughout the outer circumference thereof whereby the bulkhead 36, rear wall 30, and sealing member 38 define an air inlet chamber 40 in which is supported a dryer heating means 42 which is shown representatively in the illustrated embodiment as being an electrically energizable heater including a pair of electrical resistance elements 44, 46 as seen in FIGURE 2.

The chamber 40 communicates through an opening 48 in the rear bulkhead 36 with a space 50 formed between the rear bulkhead 36 and a rear wall 52 of the dryer 10 which includes an opening 54 therein for communicating the space 50 exteriorly of the outer shell of the dryer 10. Additionally, the chamber 40 communicates with the interior 56 of the tumbling drum 14 through a plurality of perforations 58 in the rear wall of the tumbling drum 14. The interior 56 of the tumbling drum is thereby in serial flow relationship with the outside of the drum through opening 54, the space 50, the opening 48 in the rear bulkhead 36 thence through the air inlet chamber 40 and the perforations 58. The series flow air path thence passes from the interior of the drum through the front thereof and into a duct 60 in the closure member 28 from whence the air flow path is directed through an outlet 62 in the port plate 22 into a front duct space 64 formed by the front wall of the dryer 10 and a duct member 66 spaced inwardly thereof. Across the front duct 64 can be located a removable lint screen 68 for removing lint from the air flow path as it is directed through an outlet 70 in the duct 66 into the inlet conduit 72 of a blower 74 which has an exhaust conduit 76 connected to its outlet for directing the serial air flow path exteriorly of the dryer.

In the illustrated arrangement, the blower 74 is driven by a shaft 78 operatively connected to an electric motor 80 which has a second shaft 82 connected thereto for driving a belt-pulley system 84 to rotate the tumbling drum 14 when the motor 80 is energized. By virtue of the above-illustrated arrangement, when the electric motor 80 and heating means 42 are energized, air is drawn from exteriorly of the cabinet through the inlet space 50, the inlet air chamber 40, to be heated by the heating means, thence through the perforations 58 in the rear wall 30 in the tumbling drum 14 and thence to be distributed through the articles tumbled within the interior 56 of the drum 14 by baffles 86 on the side wall of the drum 14 directed radially inwardly thereof. Fluid flow thence is passed through the inlet opening 26 in the port plate of the dryer and through the duct 60 in the door 28, thence through the front duct 64 and across the filter 68 to be directed into the inlet conduit 72 of the blower 74 which is operative to discharge fluid through the conduit 76 exteriorly of the cabinet.

In accordance with certain principles of the present invention, the dryer 10 is controlled during its operation in accordance with the moisture content of articles in the tumbling drum 14 as well as the temperature of air being circulated through the tumbling drum 14 as sensed at the exhaust side of the drum 14. More particularly, in the illustrated arrangement the moisture content of articles within the tumbling drum 56 is sensed by a primary control system including a probe assembly 88 supported on the rear wall 30 of the tumbling drum 14 to extend interiorly of the drum 14 at a point located centrally thereof. The probe 88 includes a nose portion 90 on which are located a plurality of spaced apart electrodes 92, 94 diagrammatically shown in the circuit of FIGURE 2. The electrodes 92, 94 are contacted periodically by the wet articles in the interior 56 of the drum and the conductivity of the wet articles completes a bridge between the electrodes 92, 94 for reasons to be discussed. The probe 88 is of the type more specifically disclosed in copending United States application to Miller, Ser. No. 457,435, filed May 20, 1965, reference to which may be had for a more detailed explanation of the structure of the probe 88. A predetermined plurality of the electrodes on the nose portion 90 of the probe 88 represented by reference numeral 92 in the diagrammatic showing of FIGURE 2 are electrically connected to ground by a conductor 96. Other ones of the electrodes on the nose 90 which are spaced from the electrodes 92 and are of an opposite polarity to the electrodes 92 are designated by the reference character 94 in the diagrammatic showing of FIGURE 2 and are electrically connected by a conductor 98 to an electronic control module 100 in the primary dryer control system.

The primary control further includes a relay coil 102 with its opposite ends connected to terminals 104, 106 of the module 100. The coil 102, when energized, is operative to close a relay controlled motor energization switch 108, a relay controlled module holding circuit relay 110 and a relay controlled heater energization switch 112.

The control module 100 is operative in a manner more specifically set forth in the above-mentioned copending application to maintain a motor energization circuit including switch 108; a control holding circuit including switch 110 and a heater energization circuit including switch 112 until the amount of moisture in articles contacted by the probe 90 reaches a predetermined level as preset by a manually adjustable control knob 114 that is located on a rearward control panel of the dryer 10, as seen in FIGURE 1. The operation of the control module 100 to close the switches to complete the above-described circuit and to open the switches following a predetermined cycle of dry operation can be summarized briefly in the present application by pointing out that once articles have been placed in the tumbling drum for drying and the door 28 is closed, that when a start switch 116 of the monentary type is closed a momentary energization circuit for the coil 102 is completed through the start switch 116, a conductor 118, thence through a door switch 120, which is illustrated in its closed position, to be connected to a conductor 122 which in turn is electrically connected by a conductor 124 to a terminal 126 of the module 100, which in turn is electrically connected by internal wiring including a conductor 128 and a diode 130 to one side of the coil 102. The opposite side of the coil 102 is connected through a silicon controlled rectifier 132 having its output connected by suitable internal wiring and a conductor 134 from an output terminal 136 of the module 100 to a second closed door switch 138 to wire N of the power supply. The momentary energization circuit for the coil will cause it to shift the switches 108, 110 and 112 so as to complete respectively a motor energization circuit for the motor 80, a holding circuit for the module 100 and an energization circuit for the heater 42.

More particularly, the module holding circuit is completed from wire $L_1$ through a conductor 140 thence through the holding relay controlled switch 110 which is positioned against a contact 142, thence through conductor 124 to terminal 126 of the module 100 whereby the coil 102 is energized through circuit means previously described.

The motor energization circuit can be described more particularly as running from wire $L_1$ through closed contact 144 of the momentary switch 116 thence through a conductor 146, the closed relay controlled motor energization switch 108, thence through a conductor 148 to one side of the run winding 150 of the motor 80. The opposite end of the run winding 150 is connected by a conductor 152 through the door switch 138 to wire N of the three-wire power source.

During initial energization of the motor 80 a centrifugal switch 154 of the motor 80 is positioned to include a start winding 156 in circuit with the running winding 150 until the motor reaches a predetermined percentage of its operating speed at which time the centrifugal switch 154 is moved to drop the start winding 156 and electrically engage a contact of 158 concurrently with closing a motor speed responsive switch 160 in the heater energization circuit.

Thus, once the motor is up to speed causing air to be circulated through the tumbling drum 56, the heater 42 is energized from wire $L_1$ through a conductor 162 thence through heater energization motor controlled switch 160 which is electrically connected by conductor 164 and a conductor 166 to one end of the electrically energizable resistance element 44 constituting one portion of the heater 42. The opposite end of the electrical resistance 44 is electrically connected in series with one end of the second electrically energizable resistance element 46 which has its opposite end electrically connected to a conductor 172 including a limit thermostat 174 to terminate heater energization upon the occurrence of an undesirable temperature increase in the air inlet chamber 40 and a thermally responsive bimetallic switch element 176 of a control thermostat 178 located in the exhaust duct 64 of the dryer 10 to sense the temperature of the air being circulated through the drum 14 as it leaves the drum 14.

The control thermostat 178 in turn is electrically connected by conductor 180 thence through a "no-heat" switch 182 which in turn is electrically connected by a conductor 184 and the relay controlled heater energization switch 112 through a conductor 186 to wire $L_2$. During periods when the heating element portions are energized in series the heater 42 is conditioned for a low-energy output by virtue of the series electrical resistance of the elements 44, 46 and the power source voltage across which the serially connected resistance elements 44 and 46 are connected and in the illustrated arrangement the resistance of the elements were selected to produce a 4,000 watt output during a low-energy level of operation of the dryer 10.

Additionally, the heater energization circuit includes a high-energy circuit from wire $L_2$ through conductor 162, the switch 160, the conductor 164, thence through a conductor 188 through a movable thermally responsive bimetallic arm 190 of an energy level control switch 192 that assumes the position illustrated in FIGURE 2 when cold to engage a contact 194 which is electrically connected by a conductor 196 to shunt the electrical resistance element 44 and maintain only the resistance element 46 across the power source whereby the wattage output in the working embodiment referred to is increased to 5,600 watts. The energy level control thermostat 192, when the heater 42 is conditioned for low-energy output, has the bimetallic switch arm 190 thereof positioned to engage a hot contact 198 to complete a bias circuit for the control thermostat 178 running from wire L₂ through switch 160 thence through conductor 188 and a conductor 199 which is electrically connected to one side of a bias heating element 200 having its opposite side connected by a conductor 201 to conductor 196 and thence to the remainder of the energization circuit for the serially connected resistance elements 44 and 46 during the low-energy output therefrom.

Thus, by virtue of the above-described arrangement, when wet articles are placed in the tumbling drum and the start switch 116 has been depressed to complete a motor energization and a heater circuit, initially, a large amount of energy is required to remove substantial amounts of moisture in the wet articles being tumbled. Furthermore, the air being exhausted from the tumbling drum which passes over the thermostats 178, 192 in the exhaust duct 64 is relatively cool because most of the input energy is being utilized to make up the heat of vaporization of the water in the wet articles to convert the water to a vapor state for removal from the tumbling drum 14 by the air stream. The control thermostat 178, when unbiased, has a control temperature of 140° F. and the energy level control thermostat 192 cycles from its cold position against contact 194 to its hot position against 198 when it senses a temperature of 125° F. During initial energization of the heater 42 when the exhaust air temperature is relatively cold, the energy level control thermostat 192 will be positioned as seen in FIGURE 2 so as to complete the heater energization circuit only through the resistance element 46 to produce the high-energy 5,400 watt output therefrom. Since the bimetallic control switch 176 of the controlling thermostat 178 is, when unbiased, only operative in response to temperatures of 140° F., it will remain closed whereby the energy output from the heater 42 will remain at the high 5,400 watt level until the temperature in the exhaust duct 64 reaches 125° F. For most loads such a temperature increase occurs only when substantially all of the moisture has beeen removed from the articles being tumbled. When the temperature of 125° F. does occur, the energy level control thermostat 192 has the bimetallic switch element 190 thereof positioned to engage the hot contact 198 whereby the resistance elements 44, 46 of the heater 42 are electrically connected in series to reduce the energy input to the tumbling drum 14 to 4,000/watts.

An important aspect of the present invention is that when the energy level control thermostat 192 switches from a high-energy position to a low-energy position, it concurrently completes the circuit through the bias heater 200 so as to condition the control thermostat 178 for cyclic operation in response to a lower control temperature than during high-energy output. More particularly, the bias heater 200, when energized at the low-energy output phases of operation of the illustrated controller, will condition the bimetallic member 176 of the thermostat 178 to open at a temperature below 140° F. determined by how dry the clothes are at the time the heater is conditioned for low level energy output. The thermostat 178, moreover, will cycle on and off at a rate dependent on the type of load being processed to regulate the maximum load temperature. For example, certain large loads are almost dry before thermostat 192 drops the energy input. The biased thermostat 178 will thereby be subjected to a rapidly increasing exhaust temperature and be opened to prevent any additional energy input that might cause excessive load temperatures. With smaller loads, the exhaust temperature rises slower with low energy input and the thermostat 178 will pulse open and closed at a rate that controls the low energy input to prevent an undesirable temperature increase from occurring in the tumbling drum during a terminal phase of the dryer cycle of operation.

In the illustrated control system, the thermostats 178, 192 do not terminate the operation of the dryer but rather the terminating control is established by the electronic control module 100 and associated means and, as more specifically set forth in the copending Miller application, as being operative when articles being tumbled have a moisture content as preset by control knob 114 to condition the control to terminate the drying operation.

By virtue of the air temperature and energy input control afforded by the control thermostat 178 and the energy level switching thermostat 192, the articles tumbled within the drum are maintained at a temperature below a predetermined maximum which can undesirably affect certain delicate fabrics or synthetic materials presently being marketed. While the energy input and temperature control is operatively normally to reduce the energy input as discussed above at a point precedent to final drying of the clothes to a moisture level at which the primary control of the electronic control module 100 is operative to terminate dryer operation, in certain cases, for example, when heavy articles are being dried, the energy input can be reduced prematurely to a final dryer temperature by the electronic control module 100. For example, in the case of certain heavy fabrics such as shag rugs, there can be an initial drying of the outer surface of the fabric in such materials which can cause a temperature increase on the exhaust side of the tumbling drum which is sensed by the energy switching thermostat 192 so as to cause it to be positioned in its hot location so as to serially connect the resistance elements 168, 170 and complete the bias circuit through the heater 200 of the control thermostat 178 whereby the temperature control is cyclically maintained by the control thermostat 178. In shag rugs and the like, however, even though the outer fabric layers might be dry, there is often a substantial amount of moisture retained in the core of such articles which will migrate to the outer surface and when the dryer heater is operative at a low-energy input, often the energy input is insufficient to direct an amount of energy into the tumbled fabrics to convert the free water into a vapor. As a result, the temperature on the exhaust side of the tumbling drum 14 as sensed in the duct 64 by the energy switching thermostat 192 will eventually fall to a level corresponding to a reset temperature of the thermostat 192 which in the illustrated working embodiment is a temperature of 115° F. When this occurs, the energy switching thermostat 192 will have the bimetallic switching arm 190 thereof moved into engagement with the cold contact 194 thereof so as to by-pass the resistance element 168 and connect the resistance element 170 only across the power source of wires L₁ and L₂. As a result, the heater 42 is operative to produce a high-energy output whereby the moisture migrating from the core of the heavier fabric or articles is supplied with sufficient heat to vaporize the free moisture. The resetting of thermostat 192 reduces the duration of the drying cycle without overdrying, overheating, or unnecessarily wasting the energy from heater 42. During the second high-energy output phase, as was the case in the first high-energy output phase, the control thermostat 178 is no longer biased and is operative to keeep the energization circuit for the single heating element 170 continually closed until the temperature in the duct 64 sensed by the energy level switching thermostat 192 again attains the 125° F. temperature to condition the heater for low energy output. The number of cycles of switching between the low and high-energy output of the heater 42 will depend on the type of article being treated. For small loads, and relatively light fabrics, it is typically the case that the thermostatic control system will cycle only one time from the high-energy input to the low-energy input. For regular articles it is possible that the thermostatic control will at least cycle the high-energy input once following the low-energy input phase of operation. In certain heavy article type of loads such as those loads containing shag rugs and towels and the like, it is possible that the thermostatic control will cycle between the high and low-energy outputs several times before the free moisture in the articles is reduced to a level at which the thermostatic control will maintain the heater portion 42 energized at a low-energy input during the final phases of the drying cycle of operation.

In any case, however, once the moisture content in the articles is reduced so that the thermostatic control is operative to condition the dryer heater to a low-energy input, final termination of drying is established by the control module 100 in the following manner. As the moisture content is lowered as discussed above, as the tumbled articles contact the spaced apart probes 92, 94 gradually an increasing electrical resistance is produced between the electronic control module 100 and ground whereby a capacitor 202 in the module 100 is charged through a circuit from wire $L_1$, conductor 140, relay controlled switch 110, conductors 124, 128, the diode 130 thence through a diode 204, a resistance 206, a resistance portion 208 of a potentiometer 210 which has a movable contact carrying arm 212 that is operated by the control knob 114 to vary the charging rate of the capacitor 202 in accordance with a desired predetermined moisture content which is to be present in the finally dried articles, thence through a conductor 214 and a resistance 216 to one side of the capacitor 202 which has the opposite side thereof electrically connected through a resistance 218 to ground. A conductor 220 connects the grounding circuit through the spaced apart electrodes 92, 94 of the clothes sensing probe 88 to the charging circuit for the capacitor 202 whereby, during periods when the articles are above a predetermined moisture content as preset by the control knob 114, current flow through the charging circuit is by-passed to ground to the electrodes 92, 94. Eventually, however, the increase in the resistance of the fabrics contacting the spaced apart probes 92, 94 will be sufficient to allow enough current flow to the capacitor 202 to produce a potential thereacross sufficient to energize a circuit through resistance 222 and a neon bulb 224 to apply a voltage to the base of a control transistor 226 that is thereby rendered conductive to by-pass the gate current of the relay energizing silicon controlled rectifier 132 through a conductor 228 connected to the emitter of the transistor 226, thence through a conductor 230 to wire N. This shuts off the rectifier 132 causing de-energization of the relay coil 102 whereby the relay controlled switch 112 for the heater energization circuit is opened to terminate energy input to the dryer; the relay controlled switch 110 for the energization circuit for the module 100 is opened; and the relay controlled switch 108 for the motor energization circuit is opened. A motor energization circuit is maintained for a predetermined cool-off perod through a circuit from wire $L_1$, conductor 162, the motor controlled switch 160 thence through the conductor 164, conductor 188, the energy input switching thermostat 192 which is located at its hot position in engagement with contact 198, thence through a conductor 232 through the centrifugal switch 154 of the motor 80 thence through the running winding 150, and conductor 152 to wire N. When the temperature in the exhaust duct 64 drops to the 115° F. temperature mentioned above, the switching thermostat 192 will assume its cool position to terminate motor energization. When this occurs, a high impedance coil 234 of alarm 236 is energized through the motor 80 to indicate the end of the drying cycle. Also at the end of the drying cycle, the capacitor 202 is discharged through a resistor 237, thence through the energization circuit for the coil 102 to the neutral wire N.

While the illustrated embodiment of the invention discloses an electric heater 42 having first and second energizable resistance elements therein operatively connected to the control circuit for producing high and low-energy inputs to the dryer, it will be appreciated that the concepts of the present invention are suited equally for use with gas heaters wherein the gas heater is supplied by fuel from a valve assembly of the two-level type wherein a high and low-level of thermal energy output can be provided as desired in accordance with the controlling concept of the present invention.

Another important aspect of the dryer of the present invention is the provision of a speed selector switch 238 in the motor energization circuit. The speed selector switch has a movable switch blade 240 positioned during the operation discussed above to energize the running winding 150 to produce a predetermined tumbling drum speed which in one working embodiment was 49 r.p.m. It is observed that such a tumbling drum speed causes regular loads to have a desired tumbling action through the interior 56 of the drum 14 whereby the heated air stream is passed through the clothes in good moisture removing heat transfer relationship therewith. Small loads, for example, a few socks and a shift having a weight less than a predetermined value, however, at this speed tend to hang on the inner surface of the drum. This is believed to be caused in part by the extended surface arc of the tumbling drum and the small mass of such loads and other factors such as a tendency to build up static electricity in certain synthetic fabrics and a lack of interaction between the component parts of the mass of small loads. This causes an inadequate tumbling pattern through the interior 56 of the drum whereby the heated air stream passing therethrough will not be in good heat transfer relationship with the small load. Accordingly, in the present invention the selector switch 238 is presettable for such small loads to cause the movable switch blade 240 thereof to de-energize the run winding 150 and energize a second run winding 242 that is effective to produce a low-speed motor output that, in the case of one working embodiment, resulted in a tumbling drum speed of 33 r.p.m. The reduced speed of rotation of the tumbling drum causes the small loads mentioned above to tumble through the interior of the drum so as to increase the effectiveness of the heated air stream in removing moisture therefrom. Furthermore, in the case of the above-described dryness control utilizing spaced apart probes 92, 94, such improved tumbling action of small loads causes periodic contact between the probes and the articles otherwise unobtainable. As a result, the controller is more effective to terminate drying when the articles of the small load have been processed to a predetermined moisture content.

At both the high and low speed settings of the selector switch 238, the thermostatic control system is operative as discussed above. However, in the case of the small loads, the high energy input period established by the thermostatic control is of a reduced duration as compared to that present in the case of regular loads.

While the embodiment of the present invention as herein disclosed constitutes a preferred form, it is to be understood that other forms might be adopted.

What is claimed is as follows:

1. In a dryer apparatus, the combination of means for tumbling articles to be dried, means for directing fluid stream through said tumbling means, heater means for raising the temperature of the fluid stream being directed through said tumbling means, circuit means for controlling the energization of said heating means at a high-energy output level and a low-energy output level, said circuit means including first thermostatic means for conditioning said heating means from a high-energy ouptut to a low-energy output upon the occurrence of a first predetermined temperature sensed by said thermostatic means, said circuit means including second thermostatic means operative to control heater energization in response to a temperature of said fluid stream above said first predetermined temperature during operation of said heating means at a high-energy output, said second thermostatic means including means operative in response to a lower temperature of said fluid stream when said heating means is operative at its low-energy output to cyclically control the energization thereof in accordance with the increase in the temperature of said fluid following switching from said high-energy output to said low-energy output.

2. In a dryer apparatus the combination of means for tumbling articles to be dried, means for circulating air through said tumbling means, heating means for raising the temperature of air being circulated through said tumbling means, circuit means for conditioning said heating means to produce a first predetermined energy output therefrom and a second lower energy output therefrom, said circuit means including first thermally responsive means sensing the temperature of the air being circulated through said dryer and being operative to maintain the temperature of the air being circulated through said tumbling means below a first predetermined temperature during high-energy output from said heating means, said circuit means including second thermostatic means for sensing the air stream passing through said tumbling means operative to condition said heating means for a low-energy output therefrom when said second thermostatic means senses a temperature lower than the control temperature of said first thermostatic means when said heating means is energized for a high-energy output, said first thermostatic means cycling the energization of said heating means during its low-energy input to maintain the air stream through said tumbling means at a temperature lower than the control point of said first thermostatic means under high-wattage output from said heating means.

3. In a dryer apparatus including means for circulating heated air through wet articles, the combination of heating means for raising the temperature of fluid being passed through the wet articles, said heating means being operative at a high-energy output and a low-energy output, circuit means for conditioning said heating means for high and low-energy output therefrom, said circuit means including first thermostatic means for sensing the temperature of fluid being circulated through the wet articles and responding to a predetermined temperature of the fluid to switch said heating means from high-energy output therefrom to low-energy output therefrom, said circuit means further including second thermostatic means for sensing the temperature of said fluid stream and operative during high-energy output from said heating means to respond only to a temperature above said switching temperature, said second thermostatic means being operative during low-energy output from said heating means to cycle the energy output from said heating means during low-energy output therefrom to maintain the temperature of said air stream below the switching temperature of said first thermostatic means.

4. A method for drying wet articles comprising the steps of passing a stream of air through the wet articles, operating heating means at a high-energy output for heating the air stream, reducing the energy output from said heating means when the air stream reaches a first predetermined temperature, controlling the reduced energy output from said heating means to prevent the temperature of the air stream through the wet articles from increasing above the temperature at which the heating means is switched from a high-energy output to a low-energy output, and terminating the drying action of the heating directly in response to moisture contained in articles being heated by the air stream.

5. In a dryer apparatus of the type including means for directing a heated air stream through wet articles to remove moisture therefrom, the combination of heating means operable at a high-energy output and a low-energy output, circuit means for maintaining said heating means continuously at its high-energy output until the temperature of air passing through the wet articles reaches a predetermined temperature, said circuit means including means for sensing the predetermined temperature and conditioning said heating means for a low-energy output therefrom, said circuit means further including means responsive to the air temperature and operative to modulate the heating means during low-energy output therefrom to prevent the temperature of the air stream from increasing above said predetermined temperature at which said heating means is conditioned from a constant high-energy output to a modulated low-energy output.

6. In the combination of claim 5, said circuit means for conditioning said heating means for both high- and low-energy output including means in direct physical contact with the wet articles for measuring the moisture content therein and operative to terminate drying by said heating means when the amount of moisture in said articles reaches a predetermined level.

7. In the combination of claim 5, said means for maintaining said heating means at a constant high-energy output including thermostatic means for sensing the temperature of the heated fluid stream passing through the wet articles and including means operative during the constant high-energy output level for maintaining said heating means continuously effective, said thermostatic means further including means responsive to operation of said heating means at a low-energy output and operative to condition said thermostatic means for cyclically operating said heating means at low-energy output from said heating means in response to a temperature in the fluid stream which is less than the temperature of the fluid stream at which the heating means is conditioned from high-energy output to low-energy output.

8. In the combination of claim 5, said circuit means for varying the energy output of said heating means including main control thermostat means, heater means for biasing said main control thermostat means for controlling the effectiveness of said heating means during its low-energy phases of operation, and switching thermostat means responsive to the air stream temperature passing through the wet articles and operative upon sensing said predetermined temperature in the fluid stream to energize said biasing heater means whereby said main control thermostat means is operative to cyclically control the effectiveness of the heating means during its low-energy output phase of operation in response to air stream temperatures sensed by the main control thermostat lower than the predetermined switching temperature.

9. In the combination of claim 6, said circuit means for controlling the level of energy output from said heating means including further thermostatic means operative in conjunction with said first mentioned thermostatic means to condition said heating means for high-energy output therefrom, said further thermostatic means being responsive to the predetermined temperature and operative to condition said heating means for low-energy output under the modulating control of said aforementioned thermostatic means.

10. In a dryer apparatus, means for tumbling articles to be dried, means for passing a fluid stream through the tumbled articles to remove moisture therefrom, heating means for raising the temperature of said fluid stream for removing moisture from said articles, circuit means for energizing heating means, control means for conditioning said circuit means to render said heating means operative during a drying cycle of operation, said control means including means for directly contacting the articles being tumbled and responsive to a predetermined moisture level in said contacted clothes to condition said circuit means for de-energizing said heating means, and means operative independently of said control means for varying the energy output from said heating means between a high-energy state and a low-energy state in response to a temperature of air being circulated through the tumbled articles being directly contacted by said control means.

11. In the combination of claim 10, said control means including a pair of spaced apart electrodes in said tumbling drum for contacting said wet articles and being bridged thereby through the moisture in the articles contacted thereby, and capacitor means electrically connected with respect to said electrodes continuously during the operation of said control means for terminating heating, charging means for said capacitor means, said electrodes when bridged by articles having a predetermined moisture content therein effectively isolating said charging means from said capacitor whereby said control means maintains said heating means energized.

12. In the combination of claim 10, said means for varying the energy output of said heating means including main control thermostat means, heater means for biasing said main control thermostat means for controlling the effectiveness of said heating means during its low-energy phases of operation, and switching thermostat means responsive to the air stream temperature passing through the wet articles and operative upon sensing said predetermined temperature in the fluid stream to energize said biasing heater means whereby said main control thermostat means is operative to cyclically control the effectiveness of the heating means during its low-energy output phase of operation in response to temperature sensed by the main control thermostat in the air stream lower than the predetermined switching temperature.

13. In an electric clothes dryer the combination of means for tumbling articles to be dried, means for passing a fluid stream through said tumbling articles for removing moisture therefrom, a plurality of electrical heaters, circuit means for energizing said plurality of electric heaters including first thermostat means and second thermostatic means, said first and second thermostatic means sensing the temperature of the air passing through said tumbling means, said first thermostat of said energization circuit being operative to shunt one of the plurality of electrical heaters whereby the energy output from said plurality of heaters is increased, said second thermostatic means controlling the energization of said plurality of heating means during the increased wattage output therefrom in response to the temperature of the fluid stream being circulated through said tumbling means, said first thermostat means upon sensing a predetermined temperature in said fluid stream being operative to connect the shunted one of said plurality of electrical heaters in series relationship with the other of the heaters to produce a decreased energy output from said plurality of heaters, means biasing said second thermostat means, said biasing means being energized during the low-energy output from said plurality of heaters, said second thermostat being operative when biased to cyclically control the energization of said plurality of heaters to maintain the temperature of said fluid stream passing through said tumbling means at a temperature below said predetermined switching temperature.

14. In the combination of claim 13, said biasing means being included in an energization circuit that includes said first thermostat means when it is switched to its hot position.

15. In the combination of claim 13, said energization circuit for said plurality of heaters including switch means responsive to energization of said tumbling means, and means independent of said thermostat means responsive to the condition of the articles in said tumbling drum for de-energizing said tumbling drum when said articles have a predetermined percentage of moisture therein whereby said tumbling means is de-energized to finally terminate energization of said plurality of heaters.

16. In the combination of claim 14, said first thermostat means having a reset temperature lower than the control temperature of said second thermostat means during its cyclical control of energy from said plurality of heaters during their low-energy output phase of operation whereby when said fluid stream through said tumbling means decreases in temperature below the controlling temperature of said second thermostat means said first thermostat is operative to shunt said one of said plurality of heaters to increase the energy output of said plurality of heaters.

References Cited

UNITED STATES PATENTS

| | | | |
|---|---|---|---|
| 3,072,386 | 1/1963 | Horecky | 34—52 XR |
| 3,096,164 | 7/1963 | Stone | 34—45 |
| 3,266,168 | 8/1966 | Sones et al. | 34—52 XR |
| 3,330,047 | 8/1967 | Rodgers | 34—45 |

KENNETH W. SPRAGUE, *Primary Examiner.*